(12) United States Patent
Gallup et al.

(10) Patent No.: US 8,192,255 B2
(45) Date of Patent: Jun. 5, 2012

(54) TOOL HOLDER WITH TAPERED SLOT FOR A GRINDING MACHINE

(76) Inventors: Eric Gallup, Rochester, MI (US); Tchavdar V. Tchakarov, Monroe, MI (US)

(*) Notice: Subject to any disclaimer, the term of this patent is extended or adjusted under 35 U.S.C. 154(b) by 333 days.

(21) Appl. No.: 12/704,434

(22) Filed: Feb. 11, 2010

(65) Prior Publication Data

US 2011/0195644 A1 Aug. 11, 2011

(51) Int. Cl.
B24B 21/18 (2006.01)
(52) U.S. Cl. ........ 451/442; 451/353; 451/359; 451/548; 403/263; 125/22
(58) Field of Classification Search .............. 451/442, 451/353, 359, 56, 548, 542, 543, 363, 65; 125/3, 22; 279/89, 102; 403/263, 353
See application file for complete search history.

(56) References Cited

U.S. PATENT DOCUMENTS

| | | | | |
|---|---|---|---|---|
| 1,719,072 A * | 7/1929 | Myers | ............................ | 403/326 |
| 2,111,955 A * | 3/1938 | Akans | ............................ | 451/516 |
| 2,747,343 A * | 5/1956 | Gellert | .......................... | 451/342 |
| 4,621,871 A * | 11/1986 | Salani | ............................ | 299/107 |
| 5,054,245 A * | 10/1991 | Coty | .............................. | 451/353 |
| 5,076,023 A * | 12/1991 | Saguchi | ......................... | 451/540 |
| 5,567,503 A * | 10/1996 | Sexton et al. | .................. | 428/143 |
| 5,683,143 A * | 11/1997 | Peterson et al. | .............. | 299/41.1 |
| 5,788,224 A * | 8/1998 | Platt | ................................ | 256/66 |
| 6,234,708 B1 * | 5/2001 | Beck et al. | ..................... | 403/353 |
| 6,234,886 B1 * | 5/2001 | Rivard et al. | ................... | 451/353 |
| 6,332,836 B1 * | 12/2001 | Tseng | ............................ | 451/359 |
| 6,357,957 B1 * | 3/2002 | Champlin | ..................... | 403/256 |
| 7,144,315 B1 * | 12/2006 | Sun et al. | ....................... | 451/541 |
| 7,147,548 B1 * | 12/2006 | Mehrabi | ........................ | 451/323 |
| 7,506,644 B2 * | 3/2009 | Park | ................................ | 125/22 |
| 7,713,109 B2 * | 5/2010 | Estes | ................................ | 451/56 |
| 7,997,960 B2 * | 8/2011 | Williams, Sr. | ................. | 451/353 |
| 2007/0060029 A1 * | 3/2007 | Kraenzler et al. | ............. | 451/359 |
| 2007/0254568 A1 * | 11/2007 | Park | ................................ | 451/548 |
| 2008/0108286 A1 * | 5/2008 | Thysell et al. | ................. | 451/353 |
| 2008/0176498 A1 * | 7/2008 | Rossi et al. | ..................... | 451/508 |
| 2009/0075573 A1 * | 3/2009 | Williams, Sr. | ................. | 451/353 |

* cited by examiner

*Primary Examiner* — George Nguyen
(74) *Attorney, Agent, or Firm* — John A. Miller; Miller IP Group, PLC

(57) ABSTRACT

A tool holder for a grinding machine, where the tool holder is mounted to a grinding platform of the grinding machine. The tool holder includes a plate member having a tapered slot where opposing stop elements are provided within the slot at a central location. The tool includes a pair of circular elements that are positioned on either side of the stop elements in the slot and are forced into the tapered shape of the slot so that the tool is held to the tool holder.

20 Claims, 3 Drawing Sheets

TOOL HOLDER WITH TAPERED SLOT FOR A GRINDING MACHINE

BACKGROUND OF THE INVENTION

1. Field of the Invention

This invention relates generally to a tool holder for a grinding machine and, more particularly, to a tool holder for a grinding machine, where the tool holder includes a tapered slot having opposing stop elements positioned within the slot and where circular elements on the tool are positioned within the slot at either side of the opposing stop elements and are held in the slot by the tapered shape.

2. Discussion of the Related Art

Large industrial grinding machines are sometimes used to grind and polish various surfaces, such as marble floors. These industrial grinding machines typically include one or more grinding heads rotatably mounted to an underside of a platform of the machine, where grinding tools are mounted to the grinding heads. A grinding machine for grinding and polishing a marble floor may include six, twelve, eighteen or twenty-four tools, where three separate tools are mounted to each grinding head.

Various tool types are used to grind and polish a marble floor and may have different structural configurations and different abrasive materials, such as diamond particles. Different grinding heads may support different tool types, where the grinding head must be removed from the platform and replaced with another grinding head to change the tool type. Therefore, when the machine operator wishes to switch from one tool type to another to another tool type, such as from a metal bonded tool to a resin bonded tool, to perform a certain grinding or polishing operation, the machine operator must remove each grinding head from the machine and replace it with other grinding heads that include the desired tools. This process is costly and time consuming. It would be desirable to provide a tool holder for the grinding machine for all tool types that are more easily replaced in a grinding machine.

SUMMARY OF THE INVENTION

In accordance with the teachings of the present invention, a tool holder for a grinding machine is disclosed, where the tool holder is mounted to a grinding platform of the grinding machine. The tool holder includes a plate member having a tapered slot where opposing stop elements are provided within the slot at a central location. The tool includes a pair of circular elements that are positioned on either side of the stop elements in the slot and are forced into the tapered shape of the slot so that the tool is held to the tool holder.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a tool holder for a grinding machine is merely exemplary in nature, and is in no way intended to limit the invention or its applications or uses.

Figure 1:
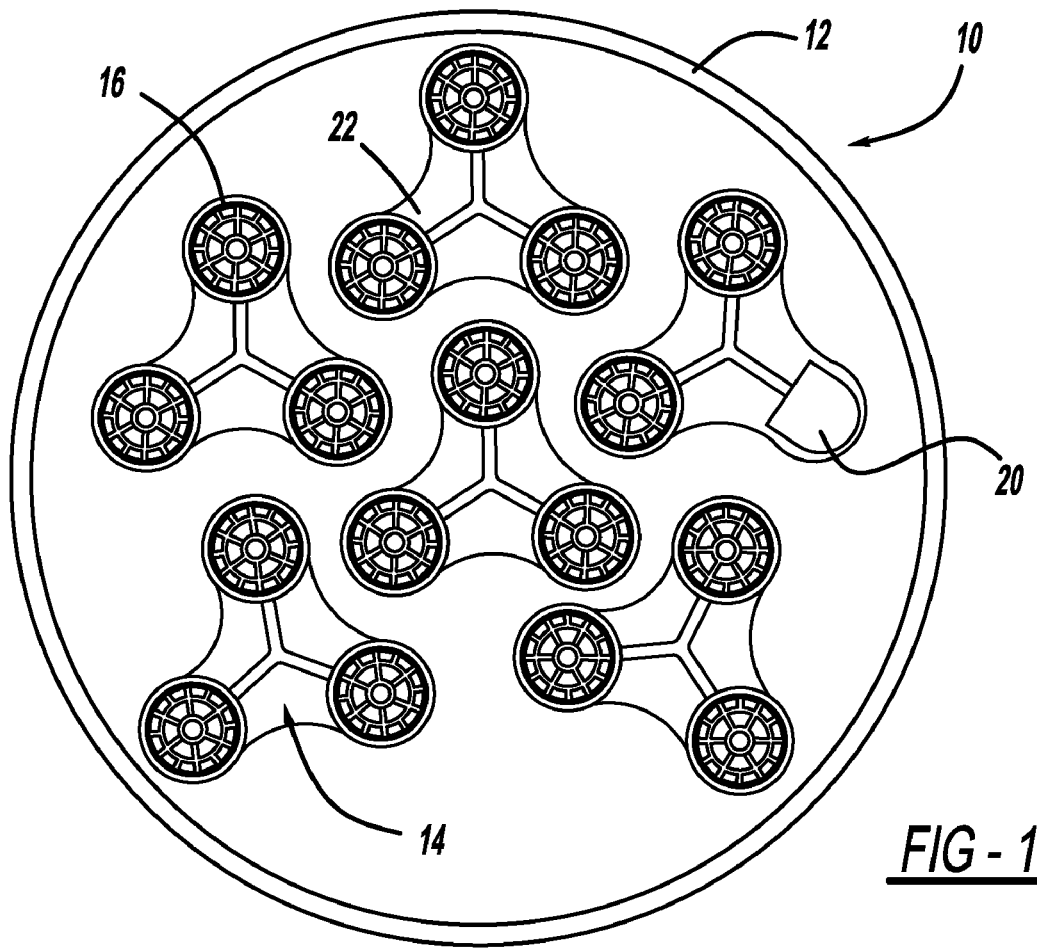
FIG. 1 is an underside view of a grinding machine including a plurality of removable tools.

FIG. 1 is an underside view of a platform 12 of a grinding machine 10. The grinding machine 10 includes a plurality of grinding heads 14 that are rotatably mounted to the platform 12, as is well understood in the art. The machine 10 may have two, four, six, eight or more grinding heads 14. The grinding heads 14 include three legs 22, where each leg 22 includes a tool holder 20. A tool 16 is mounted to each tool holder 20 in a removable engagement, as will be described in detail below. When the grinding machine 10 is up-right to grind or polish the floor, the tools 16 are maintained in place, but the tools 16 are easily removed from the tool holder 20 when the grinding machine 10 is in an overturned position.

Figure 2:
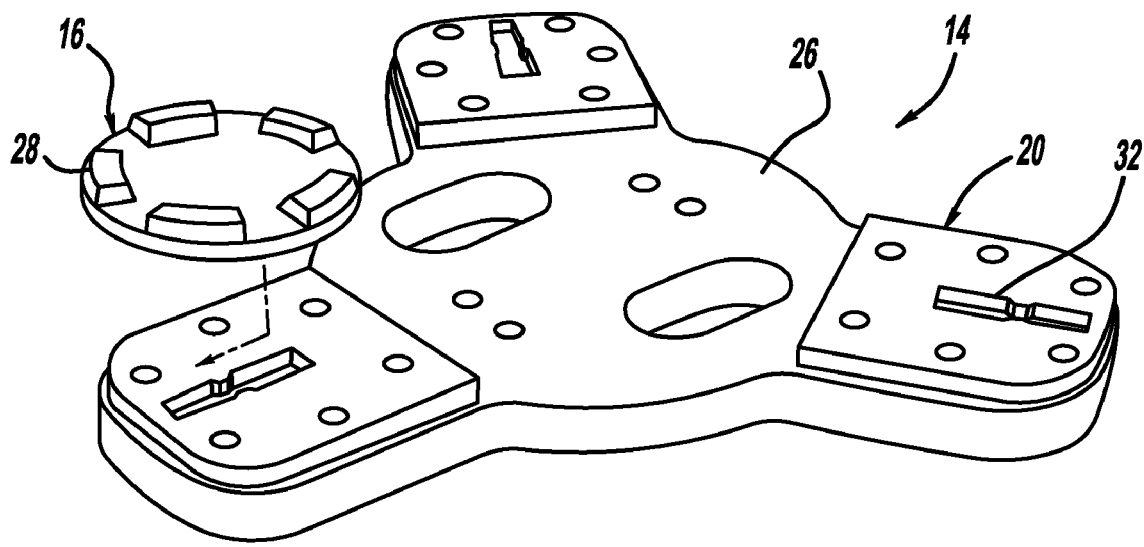
FIG. 2 is a broken-away perspective view of a grinding head of the grinding machine shown in FIG. 1 including a tool holder and a tool.
Figure 3:
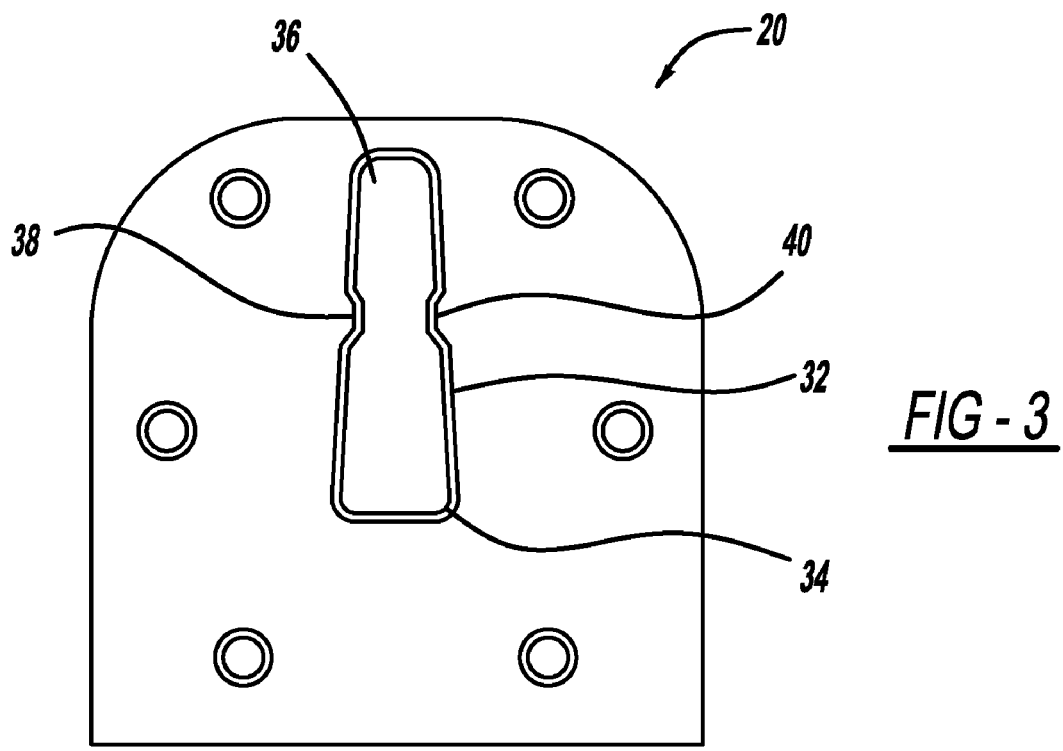
FIG. 3 is a top view of the tool holder shown in FIG. 2.
Figure 4:
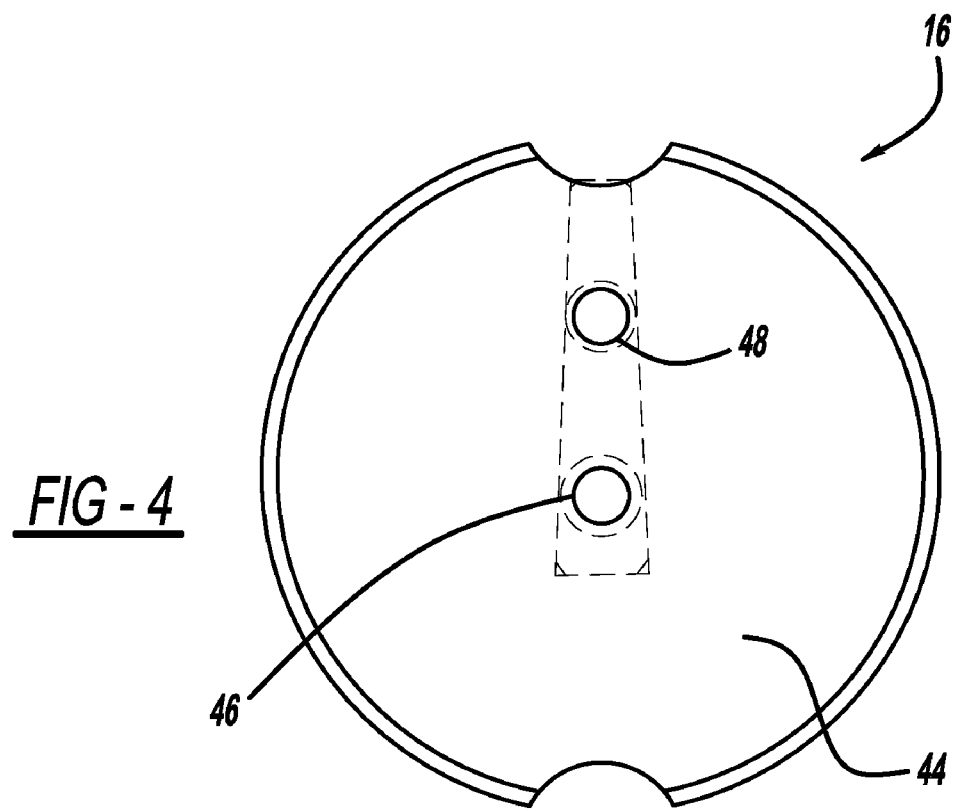
FIG. 4 is a bottom view of the tool shown in FIG. 2.

FIG. 2 is a perspective view of one of the grinding heads 14 removed from the platform 12. The grinding head 14 shows three tool holders 20 mounted to a grinding head base 26 by bolts or some other suitable securing device. FIG. 3 shows a top view of one of the tool holders 20 separated from the grinding head 14. Further, one of the tools 16 is shown separated from the tool holder 20. In this embodiment, the tool 16 is a diamond polishing tool including diamond polishing portions 28. FIG. 4 is a bottom view of one of the tools 16.

The tool holder 20 includes a tapered slot 32 having a wide end 34 and a narrow end 36 having the dimensions shown in FIG. 3, in one non-limiting embodiment, where the narrow end 36 is towards an outer edge of the grinding head 14. A pair of opposing stop elements 38 and 40 extends into the slot 32 approximately half way between the wide end 34 and the narrow end 36. The bottom surface 44 of the tool 16 includes a pair of conical shaped pins 46 and 48, where the pin 46 is substantially at the center of the tool 16. The diameter of the pins 46 and 48 and the position of the pins 46 and 48 are selected where the diameter of the pin 46 is larger than the diameter of the pin 48 so that the tool 16 is positioned on the tool holder 20 where the pin 46 is positioned within the slot 32 between the stop elements 38 and 40 and the wide end 34 and the pin 48 is positioned between the stop elements 38 and 34 and the narrow end 36. The tool 16 is then slid towards an outer edge of the tool holder 20 so that the pins 46 and 48 slide in the slot 32 until they lock in place by the size of the pins 46 and 48 and the size and shape of the slot 32. The pin 46 will lock in the slot 32 prior to it reaching the stop elements 38 and 40 and the pin 48 will lock in the slot 32 prior to reaching the end 36, thus holding the tool 16 to the tool holder 20.

The centrifugal force of the rotation of the tool 16 as the grinding machine 10 operates maintains the tool 16 coupled to the tool holder 20. When the tool 16 needs to be replaced, force can be applied against the tool 16 in the opposite direction of the taper of the slot 32 so that the pins 46 and 48 move in the slot 32 towards the wide end 34 where the tool 16 can be removed.

Figure 5:
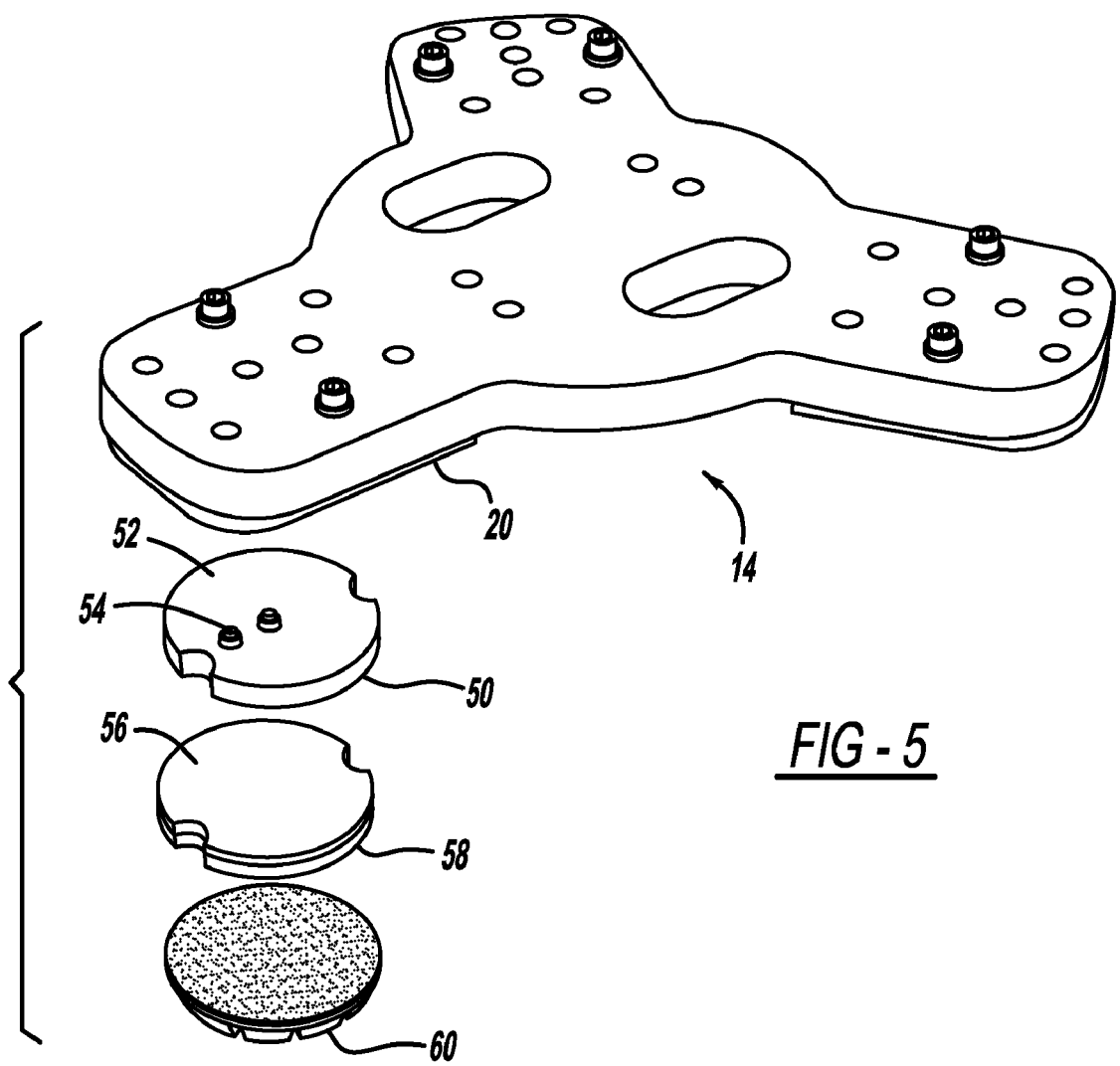
FIG. 5 is an exploded view of the grinding head shown in FIG. 2 including the tool holder, an adapter, a resin insert and a polishing pad.

FIG. 5 is a blown-apart perspective view of the grinding head 14 including the tool holders 20 and including an adaptor 50 that mounts to the tool holder 20 using pins 52 and 54 in the same manner as the tool 16. The adaptor 50 includes a Velcro attachment device (not shown) that attaches to a Velcro pad 56 of an insert 58 that allows a polishing pad 60 to attach to the insert 58.

Figure 6:
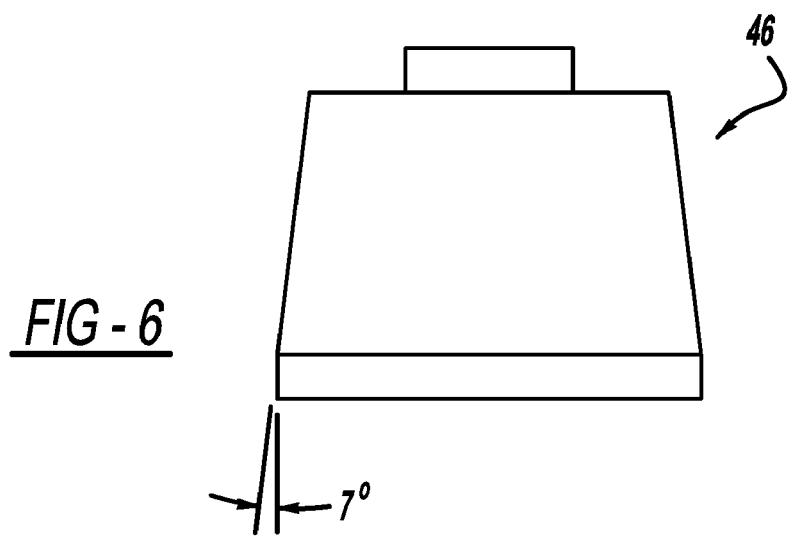
FIG. 6 is a side view of a conical pin for the tool.

FIG. 6 is a side view of the pin 46 removed from the tool 16, showing a 7° angle defining the conical shape of the pin 46.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A tool assembly comprising a tool holder having a tool holder body including a tapered slot tapered from a wide end to a narrow end and opposing stop elements extending into the slot, said tool assembly further comprising a tool having first and second conical pins where the first pin has a larger diameter than the second pin, said first pin being positioned in the slot between the opposing stop elements and the wide end of the slot and the second pin being positioned in the slot between the opposing stop elements and the narrow end of the slot so that the tapered slot engages the conical pins to lock the tool to the tool holder body.

2. The tool assembly according to claim 1 wherein the first and second conical pins have an angle of 7° defining the conical shape of the pins.

3. The tool assembly according to claim 1 wherein the narrow end of the tapered slot is proximate an edge of the tool holder body and the wide end of the tapered slot is proximate a center of the tool holder body.

4. The tool assembly according to claim 1 wherein the distance between the narrow end of the slot and the stop elements and the wide end of the slot and the stop elements is about the same.

5. The tool assembly according to claim 1 wherein the tool holder has a general rectangular configuration with two rounded corners.

6. The tool assembly according to claim 1 wherein the tool has a general circular configuration.

7. The tool assembly according to claim 1 wherein the tool is a diamond polishing tool including diamond polishing portions.

8. The tool assembly according to claim 1 wherein the tool includes an adaptor having the pins, an insert attached to the adaptor and a polishing pad attached to the insert.

9. The tool assembly according to claim 1 wherein the tool assembly is one tool assembly of a plurality of tool assemblies mounted to a rotatable grinding head.

10. The tool assembly according to claim 8 wherein the grinding head is mounted to a grinding platform of a grinding machine.

11. A tool assembly comprising a tool holder having a tool holder body including a tapered slot tapered from a wide end to a narrow end and opposing stop elements extending into the slot where a distance from the narrow end to the stop elements is about the same as the distance from the wide end to the stop elements, said tool assembly further comprising a tool having first and second pins where the first pin has a larger diameter than the second pin, said first pin being positioned in the slot between the opposing stop elements and the wide end of the slot and the second pin being positioned in the slot between the opposing stop elements and the narrow end of the slot so that the tapered slot engages the pins to lock the tool to the tool holder body.

12. The tool assembly according to claim 11 where the first and second pins are conical shaped pins.

13. The tool assembly according to claim 12 wherein the first and second conical shaped pins have an angle of 7° defining the conical shape of the pins.

14. The tool assembly according to claim 11 wherein the narrow end of the tapered slot is proximate an edge of the tool holder body and the wide end of the tapered slot is proximate a center of the tool holder body.

15. The tool assembly according to claim 11 wherein the tool holder has a general rectangular configuration with two rounded corners.

16. The tool assembly according to claim 11 wherein the tool has a general circular configuration.

17. The tool assembly according to claim 11 wherein the tool is a diamond polishing tool including diamond polishing portions.

18. A tool assembly for a grinding head that is mounted to a grinding platform of a grinding machine, said tool assembly be one tool assembly of a plurality of tool assemblies, said tool assembly comprising a tool holder having a tool holder body including a tapered slot tapered from a wide end to a narrow end and opposing stop elements extending into the slot where a distance from the narrow end to the stop elements is about the same as the distance from the wide end to the stop elements, wherein the narrow end of the tapered slot is proximate an edge of the tool holder body and the wide end of the tapered slot is proximate a center of the tool holder body, said tool assembly further comprising a tool having first and second pins where the first pin has a larger diameter than the second pin, said first pin being positioned in the slot between the opposing stop elements and the wide end of the slot and the second pin being positioned in the slot between the opposing stop elements and the narrow end of the slot so that the tapered slot engages the pins to lock the tool to the tool holder body.

19. The tool assembly according to claim 18 where the first and second pins are conical shaped pins.

20. The tool assembly according to claim 19 wherein the first and second conical shaped pins have an angle of 7° defining the conical shape of the pins.

* * * * *